No. 698,764. Patented Apr. 29, 1902.
G. R. TYLER.
PRUNING SAW.
(Application filed Aug. 13, 1901.)
(No Model.)
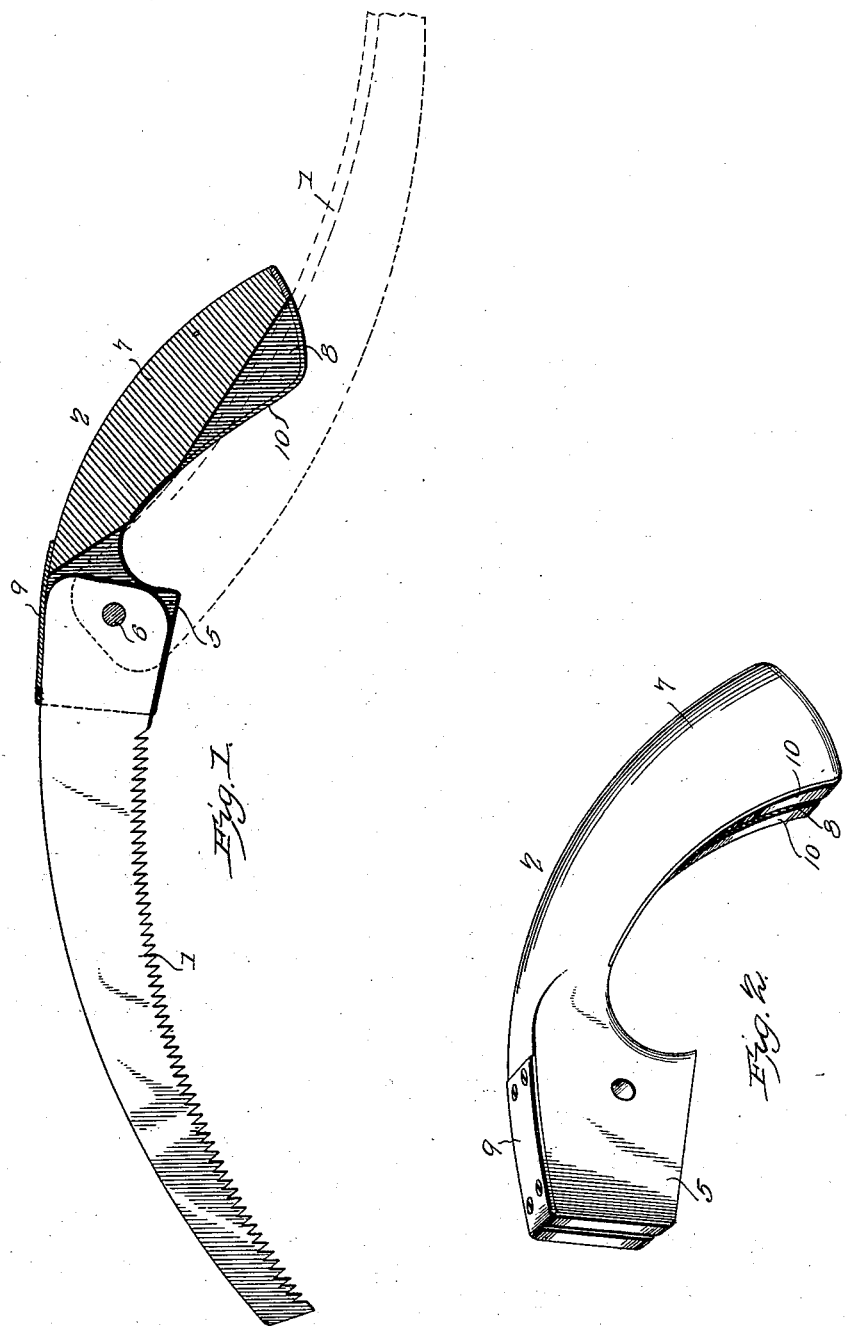

UNITED STATES PATENT OFFICE.

GEORGE R. TYLER, OF POMONA, CALIFORNIA.

PRUNING-SAW.

SPECIFICATION forming part of Letters Patent No. 698,764, dated April 29, 1902.

Application filed August 13, 1901. Serial No. 71,962. (No model.)

*To all whom it may concern:*

Be it known that I, GEORGE R. TYLER, a citizen of the United States, residing at Pomona, in the county of Los Angeles and State of California, have invented a new and useful Pruning-Saw, of which the following is a specification.

This invention relates to pruning-saws, and has for its object to present a saw that shall be thoroughly effective in use and in which the disposition of the teeth shall be such that the highest cutting qualities shall be attained with the least resistance to operation.

A further object is to provide a pruning-saw of a collapsible character, thereby to permit of its being readily carried upon the person of the user.

With these and other objects in view, as will appear as the nature of the invention is better understood, the same consists in the novel construction and combination of parts of a pruning-saw, as will be hereinafter fully described and claimed.

In the accompanying drawings, forming a part of this specification, and in which like numerals of reference indicate corresponding parts, there is illustrated a form of embodiment of the invention capable of carrying the same into effect, it being understood that the elements herein exhibited may be varied or changed as to shape, proportion, and exact manner of assemblage without departing from the scope of the invention; and in the drawings—

Figure 1 is a view in perspective of the saw, the opened position of the blade being shown in full lines and its closed position in dotted lines. Fig. 2 is a detached detail view in perspective of the handle.

Referring to the drawings, 1 designates the blade of a saw, and 2 the handle. The blade and the handle are each curved on a line struck from a common center, the teeth of the saw being on the inner curve of the blade. In order that the teeth of the saw shall operate in the same manner as though they were disposed in a straight line—that is, with the cutting-faces disposed at right angles to the line of draft—and also that the saw may be readily used for lopping off limbs elevated above the head of the user, the cutting-faces of the teeth are disposed at right angles to the line of draft and are pitched toward the handle, so that cutting is effected on the draw of the blade and not on the thrust, as with saws of the ordinary construction.

The handle 2, to which reference has been made, is provided with a slotted head 5, between the members of which the blade is pivoted and is held in position by a bolt 6, the grip portion 7 of the handle being provided with a recess 8, in which the blade rests when folded up, as shown in dotted lines in Fig. 1, thereby to permit the saw being carried upon the person of the user. In order to reinforce the handle against splitting, the top and front end of the head portion has secured to it a metallic strip 9, slotted to receive the saw, that portion of the strip on the top of the head serving as a stop to limit upward movement of the blade and the inner side of the grip portion, and the butt thereof has secured to it a slotted strip of metal 10, which operates to reinforce this portion of the handle. The grip portion of the handle is herein shown as constructed on a long curve, preferably corresponding to the curve of the blade.

Having thus fully described my invention, what I claim as new, and desire to secure by Letters Patent, is—

1. A pruning-saw comprising a handle having its head and grip slotted, reinforcing-plates secured on each side of the slotted portion of the handle and under the butt thereof, a reinforcing-plate secured to the head and having its front portion slotted and its upper portion unslotted to constitute a stop, and a saw pivotally mounted between the slotted portion of the head and engaging the stop when in operative position, the saw being designed to close in between the slotted portion of the grip to permit of the implement being carried on the person of the user, substantially as described.

2. A pruning-saw comprising a curved handle having its head and grip slotted, reinforcing-plates secured on each side of the slotted portion of the handle and under the butt thereof, a reinforcing-plate secured to the head and having its front portion slotted and its upper portion unslotted to constitute a stop, and a curved saw pivotally mounted between the slotted portions of the head and engaging the stop when in operative position, the saw being designed to close in between the slotted portion of the grip, substantially as described.

In testimony that I claim the foregoing as my own I have hereto affixed my signature in the presence of two witnesses.

GEO. R. TYLER.

Witnesses:
L. C. HANNUM,
WILBERT R. SISSON.